(12) United States Patent
Roberts et al.

(10) Patent No.: US 11,372,389 B2
(45) Date of Patent: Jun. 28, 2022

(54) METHODS FOR MONITORING STATUS OF A LIGHT FIXTURE AND RELATED MONITORING MODULES AND COMPUTER PROGRAM PRODUCTS

(71) Applicant: Sensus Spectrum, LLC, Morrisville, NC (US)

(72) Inventors: Ryan Mark Roberts, Wilmington, NC (US); Pedro Paulo Dias e Silva, Charleston, SC (US); Charles Milton Nobles, Raleigh, NC (US)

(73) Assignee: Sensus Spectrum, LLC, Morrisville, NC (US)

( * ) Notice: Subject to any disclaimer, the term of this patent is extended or adjusted under 35 U.S.C. 154(b) by 0 days.

(21) Appl. No.: 17/061,642

(22) Filed: Oct. 2, 2020

(65) Prior Publication Data

US 2021/0109494 A1 Apr. 15, 2021

Related U.S. Application Data

(60) Provisional application No. 62/913,930, filed on Oct. 11, 2019.

(51) Int. Cl.
*G05B 19/042* (2006.01)
(52) U.S. Cl.
CPC ............ *G05B 19/0428* (2013.01); *G05B 2219/23154* (2013.01)
(58) Field of Classification Search
CPC .......................................... G05B 2219/23154
See application file for complete search history.

(56) References Cited

U.S. PATENT DOCUMENTS

| | | | | |
|---|---|---|---|---|
| 6,204,615 B1* | 3/2001 | Levy | ............... | H05B 47/185 315/312 |
| 8,860,561 B2 | 10/2014 | Ellis et al. | | |
| 10,028,355 B1 | 7/2018 | Hancock et al. | | |
| 2009/0066258 A1* | 3/2009 | Cleland | ............... | H05B 41/40 315/158 |
| 2012/0072138 A1* | 3/2012 | Walters | ............... | H05B 47/22 702/58 |
| 2012/0105228 A1* | 5/2012 | Loveland | ............... | H05B 45/56 340/540 |
| 2012/0242507 A1* | 9/2012 | Nguyen | ............... | H05B 45/58 340/907 |

(Continued)

FOREIGN PATENT DOCUMENTS

WO  WO 02/067637 A1  8/2002

OTHER PUBLICATIONS

International Search Report and Written Opinion, PCT/US2020/053908, dated Dec. 18, 2020, 10 pages.

*Primary Examiner* — Jennifer L Norton
(74) *Attorney, Agent, or Firm* — Stanek Lemon Crouse & Meeks, PA

(57) ABSTRACT

Methods for remotely monitoring a status of a light fixture including monitoring sensor data associated with the light fixture; analyzing the monitored sensor data to determine if the light fixture is operating outside expected parameters associated with the light fixture; and altering the status of the light fixture for a finite period of time if it is determined that the light fixture is operating outside expected parameters are provide. Related monitoring modules and computer program products are also provided.

20 Claims, 7 Drawing Sheets

(56) References Cited

U.S. PATENT DOCUMENTS

| | | | |
|---|---|---|---|
| 2013/0181609 A1 | 7/2013 | Agrawal | |
| 2013/0181614 A1* | 7/2013 | Agrawal | G06F 16/29 315/153 |
| 2015/0355290 A1* | 12/2015 | Gopal Samy | H05B 47/20 702/58 |
| 2019/0045610 A1* | 2/2019 | Verfuerth | H05B 41/38 |

* cited by examiner

METHODS FOR MONITORING STATUS OF A LIGHT FIXTURE AND RELATED MONITORING MODULES AND COMPUTER PROGRAM PRODUCTS

CLAIM OF PRIORITY

The present application claims priority to U.S. Provisional Application No. 62/913,930, filed on Oct. 11, 2019, entitled Methods for Monitoring Status of a Light Fixture and Related Monitoring Modules and Computer Program Products, the contents of which is hereby incorporated herein by reference as if set forth in its entirety.

FIELD

The present inventive concept relates generally to light fixtures, and, more particularly, to controlling light fixtures to provide adequate illumination for a particular location.

BACKGROUND

Using control and monitoring systems in light fixtures, specifically, street lighting, is becoming the standard in the industry. Conventional "smart" streetlights typically have a controller associated with or integrated with a streetlight that is connected in real time to some sort of radio communications network. Inclusion of communications functionality in the streetlight allows the streetlights to be monitored remotely. For example, information from the streetlights can be used to monitor for faults or incorrect operation and a network manager may be alerted; to control if the streetlight is on or off based on calendar time or daylight levels or a pre-programmed schedule; to measure the power consumed by the streetlight to meter grade accuracy; to detect, for example, vehicular or pedestrian traffic adjacent to the streetlight and increase or decrease the brightness of the streetlight based on traffic patterns; to use satellite location to calculate the exact location of the streetlight and the like.

SUMMARY

Some embodiments of the present inventive concept provide methods for remotely monitoring a status of a light fixture including monitoring sensor data associated with the light fixture; analyzing the monitored sensor data to determine if the light fixture is operating outside expected parameters associated with the light fixture; and altering the status of the light fixture for a finite period of time if it is determined that the light fixture is operating outside expected parameters. At least one of the monitoring, analyzing and altering is performed by at least one processor.

In further embodiments, analyzing the monitored sensor data may include counting a number of times the light fixture turns on, off or adjusts an intensity thereof within a predetermined period of time, wherein the light fixture turns on, off or adjusts responsive to the monitored sensor data; determining if the number of times the light fixture turns on, off or adjusts is greater than a predetermined threshold; disabling the monitoring by ignoring the monitored sensor data for the finite period of time if it is determined that the number of times the light fixture turns on, off or adjusts is greater than the predetermined threshold; and reenabling the monitoring, the analyzing and the altering after the finite period of time.

In still further embodiments, disabling the monitoring may include disabling the monitoring a plurality of times after reenabling the monitoring and the method may further include performing further troubleshooting processes to determine if there is a mechanical problem with the light fixture.

In some embodiments, the light fixture may be operating outside expected parameters when one of the number of times the light fixture turns on, off or adjusts an intensity thereof is greater than the predetermined threshold or when a consumption of the light fixture exceeds an expected consumption for the light fixture.

In further embodiments, analyzing the monitored sensor data may include counting a number of times the light fixture turns on, off or adjusts an intensity thereof within a predetermined period of time, wherein the light fixture turns on, off or adjusts responsive to the monitored sensor data; determining if the number of times the light fixture turns on, off or adjusts is greater than a predetermined threshold; disabling the monitoring and allowing the light fixture to remain on for the finite period of time if it is determined that the number of time the light fixture turns on, off or adjusts is greater than the predetermined period of time; and reenabling the monitoring, analyzing and altering after the finite period of time.

In still further embodiments, disabling the monitoring may include disabling the monitoring a plurality of times after reenabling the monitoring and wherein the method further comprises performing further troubleshooting processes to determine if there is a mechanical problem with the light fixture.

In some embodiments, the sensor data may include data received from one or more of light sensors, motions sensors, consumption sensors, vibration sensors and temperature sensors.

Further embodiments of the present inventive concept provide monitoring modules and computer program products.

DETAILED DESCRIPTION

Figure 1:
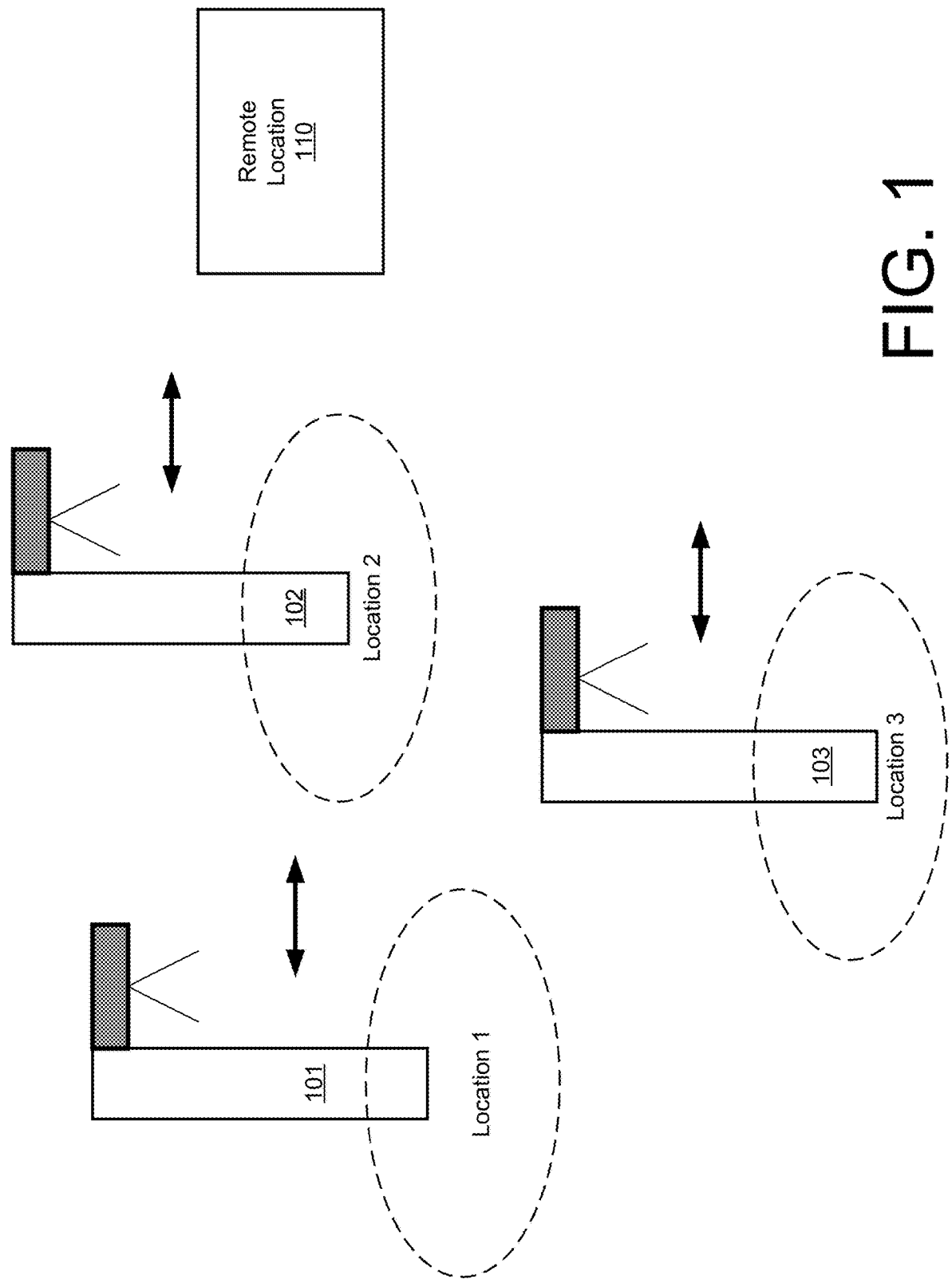
FIG. 1 is a diagram of an environment including light fixtures in various locations that communicate with a remote location in accordance with some embodiments of the present inventive concept.

The present inventive concept will be described more fully hereinafter with reference to the accompanying figures, in which embodiments of the inventive concept are shown. This inventive concept may, however, be embodied in many alternate forms and should not be construed as limited to the embodiments set forth herein.

Accordingly, while the inventive concept is susceptible to various modifications and alternative forms, specific embodiments thereof are shown by way of example in the drawings and will herein be described in detail. It should be understood, however, that there is no intent to limit the inventive concept to the particular forms disclosed, but on the contrary, the inventive concept is to cover all modifications, equivalents, and alternatives falling within the spirit and scope of the inventive concept as defined by the claims. Like numbers refer to like elements throughout the description of the figures.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which this inventive concept belongs. It will be further understood that terms used herein should be interpreted as having a meaning that is consistent with their meaning in the context of this specification and the relevant art and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

As used herein, "light fixture" refers generally to a lighting apparatus that illuminates an area in close proximity thereto. Some embodiments refer specifically to a streetlight that illuminates a road or sidewalk and is mounted to a pole or side of a building. The positioning of the light fixture/streetlight is not intended to be limited in embodiments of the present inventive concept. Any positioning of a light fixture illuminating any area can be used without departing from the scope of the present inventive concept discussed herein. "Ambient light" refers to the light in the natural environment and may have an intensity sensed by one or more sensors associated with the streetlight. It will be understood that ambient light may include light from both natural and artificial sources in the environment.

As discussed above, conventional light fixtures/streetlights may be equipped with communication circuits that allow the streetlights to communicate information to remote locations. Various of these communication circuits are discussed, for example, in U.S. Pat. Nos. 10,028,355 and 8,860,561, the contents of which are hereby incorporated herein by references. These remote locations rely on feedback from the streetlights to make decisions related to the streetlight. For example, the streetlight may include a plurality of sensors, for example, light sensors, motion sensors, vibration sensors, humidity sensors and the like. When a light sensor senses ambient light around the streetlight to be at a particular threshold, this "status" is communicated to a control module (for example, a network lighting controller (NLC)), which makes a decision to dim the streetlight (decrease the intensity), increase the intensity or turn the streetlight off based on the amount of sensed ambient light. However, since the decisions are being made automatically and/or remotely, there is no way to determine if the sensor is correctly sensing the ambient light or if the ambient light has been misinterpreted by the presence of an external light source, for example, headlights on a car. If the ambient light intensity has been misinterpreted, the decision to increase or decrease the intensity of or turn off the streetlight may be "incorrect" because it would be made based on incorrect sensed information.

Many solutions require user input to program an NLC to operate correctly, usually completed with another computing device. This is time consuming to the installer and allows for errors to be introduced into operation of the NLC. Accordingly, some embodiments of the present inventive concept provide a monitoring module associated with a network lighting controller (NLC) of the light fixtures/streetlight. The monitoring module is configured to monitor feedback from one or more sensors associated with the streetlight and make an independent determination of the whether the streetlight should be on, have the intensity increased or decreased (dimmed), or turned completely off. As used herein, "status" refers to the state of the streetlight, i.e. whether the streetlight is on, off or somewhere in between. A streetlight is defined as having an intensity from zero percent (off) to one hundred percent (on at full intensity). A streetlight in full sun may be programmed to be completely off (zero percent intensity) during the daytime, illuminated at fifty percent intensity as the sun sets and illuminated at one hundred percent intensity when it is full dark. Other streetlights may sense the ambient light around the streetlight and make an independent determination based on real-time sensor information as to whether the intensity of the streetlight should be increased or decreased to provide the necessary lighting for the present ambient light. Embodiments of the present inventive concept may be used in combination with any light fixture/streetlight capable of communicating with the monitoring module without departing from the scope of the present inventive concept.

Referring to FIG. 1, a diagram illustrating an example environment including various streetlights 101, 102 and 103 in various locations 1, 2 and 3 in communication with a remote location 110 will be discussed. As illustrated in FIG. 1, the streetlights 101, 102 and 103 are positioned in different locations 1, 2, and 3, respectively. Each of the streetlights 101, 102 and 103 is configured to communicate with the remote location 110, for example, a utility. It will be understood that although a single remote location, three streetlights and three locations are illustrated in FIG. 1, embodiments of the present inventive concept are not limited to this configuration. There could be more or less of each element without departing from the scope of the present inventive concept.

In some embodiments, the communication to and from the Streetlights 101, 102 and 103 may be provided by a FLEXNET radio network from the Sensus USA, Inc. ("Sensus"). FLEXNET radio networks operate in licensed spectrum in the 900 MHz range, with the uplink utilizing 901 to 902 MHz and the downlink utilizing 940 to 941 MHz. These spectrum allocations are subdivided into multiple narrowband channels, for example, 25 KHz channels. Individual narrowband channels can be allocated to respective control modules, or a set of control modules can be assigned to operate on one or more such channels, while other groups are assigned to other channels. Data is sent on a per-channel basis using Frequency Shift Keying ("FSK"), for example, 4, 8, or 16 FSK, where the data may be "packaged" in messages of a predefined bit length. Although some embodiments may use the FLEXNET as the radio communication network, embodiments of the present inventive concept are not limited thereto. Any radio network using any licensed or unlicensed spectrum may be used without departing from the scope of the present inventive concept.

Physically each of the streetlights 101, 102 and 103 may look the same. However, each of these streetlights 101, 102 and 103 may be positioned in different locations 1, 2 and 3, respectively. The locations 101, 102 and 103 may require different types of lighting. For example, location 1 may be in a residential neighborhood; location 2 may be a highway; and location 3 may be in a parking lot of grocery store. Each of these locations have different illumination needs and the streetlights 101, 102 and 103 are configured to fulfil these needs. The streetlights 101, 102 and 103 may all start with a same or similar piece of equipment and are programmed and configured for different operating conditions. It is widely understood that customers each have their own specific set of "conditions" and it would be very difficult to provide a different physical product to meet each customer's needs.

To effectively control the streetlights 101, 102 and 103 from the remote location 110, the details associated with each should be understood. As discussed above, although conventional streetlights can communicate information about the streetlight to a remote location, this information may not accurate and a decision of the "status" of the streetlight may be made based on inaccurate information. For new installations, the lighting network is carefully designed so that the light level all along the street and pavement satisfies the safety requirements currently in force at that time. In order to achieve this, each streetlight is chosen to provide the correct level of lighting as required and the dimming profile applied over the network is designed to match the intended location and power level of the streetlight.

As discussed above, sensors associated with the streetlight are programmed to provide information to the remote location and the "status" of the streetlight may be changed based on the sensor information provided. For example, if the light sensor senses bright ambient light around the streetlight, the status of the streetlight might be dimmed or turned off. However, the problem occurs when the ambient light being sensed is not natural light but artificial light from headlights, flashlights or other artificial light source. Thus, the status of the streetlight may not be appropriate for the actual ambient light once the artificial source has been removed as the decision would be made on inaccurate sensor information.

Accordingly, some embodiments of the present inventive concept provide a monitoring module that analyzes behaviour and/or status of a light fixture to determine if the light fixture is operating correctly. The monitoring features provided by embodiments discussed herein allow utilities to avoid having a light fixture be turned on/off or dimmed at an inappropriate time or repeatedly being turned on/off all day, which can drastically increase costs and may provide an unsafe situation if a location is not illuminated when it should be as will be discussed further below.

It will be understood that each streetlight 101, 102 and 103 is set up for the corresponding location 101, 102 and 103, respectively. As discussed above, different locations require different lighting conditions, for example, lighting intensities, on/off timing etc. In some embodiments, when the light fixture (streetlight 101, 102 and 103) is being installed, the NLC associated with the light fixture is programmed with the appropriate light intensity and behavior. As used herein, "light intensity" refers essentially to the brightness of a light. The greater the light intensity, the more energy that is present. Light intensity is the rate at which the energy from the light is received at a unit of surface. Different wavelengths of light have differing levels of energy. Light intensity may be from 0 percent (off) to 100 percent (full intensity) or anywhere in between without departing from the scope of the present inventive concept. As used herein, "appropriate behavior" or "expected parameters" refers to the specific program for each light fixture. For example, what hour of the day the light should turn on and off; what threshold of ambient light sensed at a light sensor should indicate that the light should be turned on and off; what time of day/night the intensity of the light should be changed and the like. The appropriate behavior of the light fixture may be regulated using one or more sensors at the light fixture. These sensors communicate with the remote location 110. A determination of the status of the light fixture is made at the remote location 110. However, the determination is only as good as the sensor information being provided from the light fixtures. Accordingly, some embodiments of the present inventive concept provide a monitoring module that enables light fixtures to operate efficiently and identifies situations where the light fixtures are not behaving appropriately (operating outside expected parameters), for example, if the light fixture is remaining on all day (consuming too much energy) or repeatedly turning on and off. Once a situation where the light fixtures are not behaving appropriately are identified, embodiments of the present inventive concept enable the light fixtures to self-adjust the light intensity of the light fixture to reduce the likelihood, or possibly avoid, undesired behavior.

Figure 2:
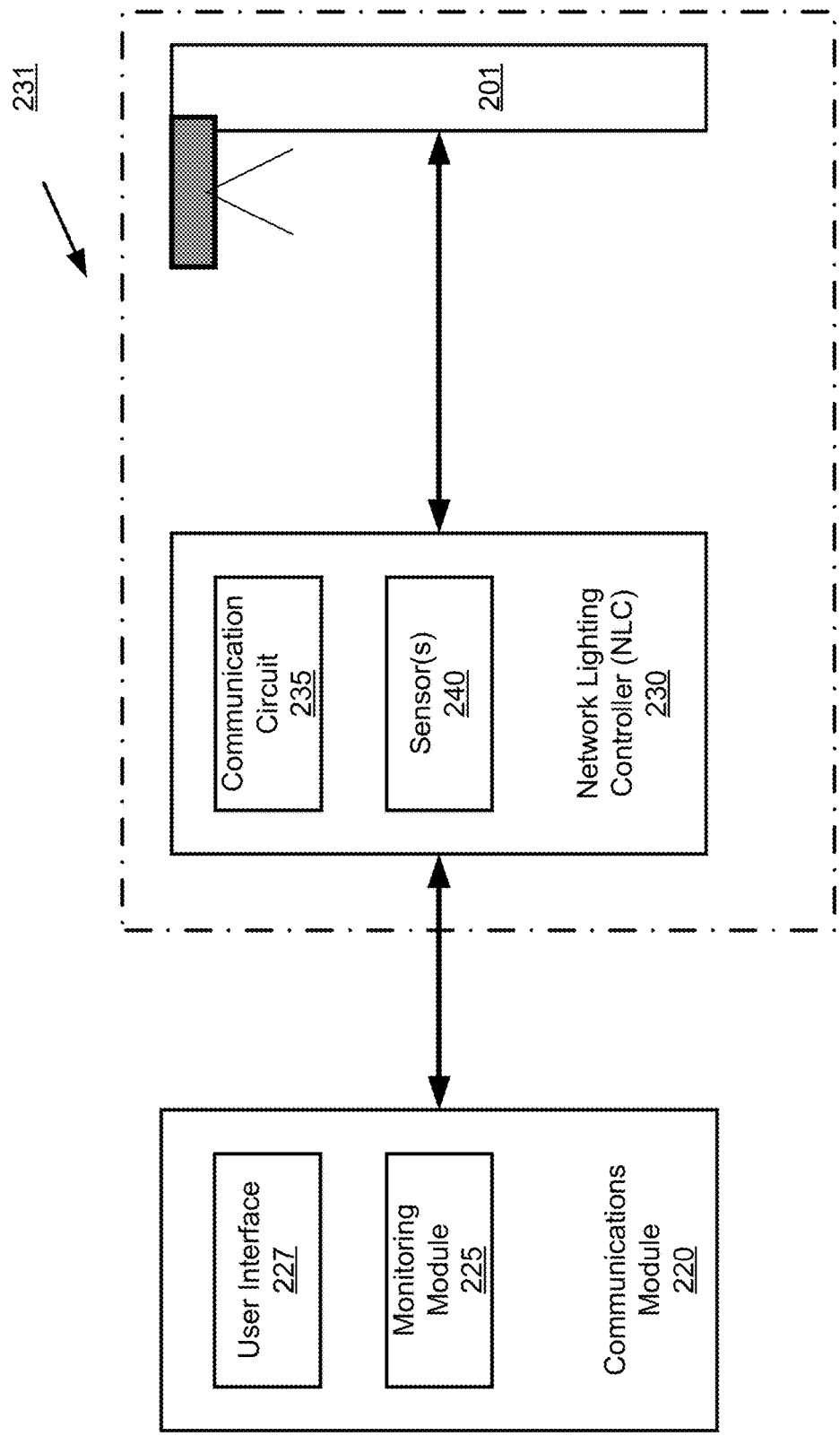
FIG. 2 is a system diagram including a network lighting controller (NLC) and a streetlight/light fixture in accordance with some embodiments of the present inventive concept.

Referring now to FIG. 2, a simplified diagram of a light fixture in communication with a monitoring module in accordance with some embodiments of the present inventive concept will be discussed. As illustrated, a communications module 220, the NLC 230 and the streetlight 201 communicate with one another. As shown by the dotted line 231, the NLC and streetlight 201 may be integrated into one unit in some embodiments. Thus, the communication circuit 235 and the one or more sensors 240 may be part of the streetlight 201. As discussed above, this communication may use FLEXNET in some embodiments. However, embodiments of the present inventive concept are not limited thereto. Typically, when an NLC 230 is installed with a light fixture/streetlight it is configured to determine when to turn the light on and off.

As illustrated in FIG. 2, the NLC 230, which may be installed at the streetlight 201, includes or is associated with one or more sensors 240 and a communication circuit 235. The one or more sensors 240 are configured to sense various present conditions of the streetlight 201 or the environment around the streetlight. For example, the sensors 240 may include, but are not limited to, light sensors, humidity sensors, motion sensors, vibration sensors, temperature sensors and the like. Thus, as used herein, "present conditions"

refer to a present state of the streetlight or the environment around the streetlight, such as, ambient light, vibration, humidity, temperature, and the like. The conditions sensed by the one or more sensors 240 are communicated to monitoring module 225 of the communications module 220 using the communications circuit 235. It will be understood, as discussed herein, that the monitoring module may be part of the NLC or other module without departing from the scope of the present inventive concept. The monitoring module 225 receives the sensed information from the one or more sensors 240 and makes determinations about the "status" of the streetlight 201 based on the received sensed conditions. The monitoring module 225 may automatically provide instructions to the streetlight 201 based on the determinations made at the monitoring module from the sensed conditions or a command may be issued by a user through the user interface 227 without departing from the scope of the present inventive concept.

It will be understood that although the communications module, the NLC and the streetlight are shown as separate modules in FIG. 2, embodiments of the present inventive concept are not limited thereto. For example, the communication module may be combined with one or more of the other modules and may be integrated with or remote from the streetlight. In some embodiments, the communication module 220 is positioned at the remote location (110, FIG. 1).

Referring now to the flowchart of FIG. 3, operations according to some embodiments of the present inventive concept will be discussed. Operations begin at block 300 by monitoring the sensor data associated with the light fixture/streetlight. The monitored sensor data is analyzed to determine if the light fixture is operating outside expected parameters associated with the light fixture. (block 310). In other words, feedback from a sensor or sensors (light, humidity, energy consumption, vibration, temperature) in the NLC may be monitored (block 300). For example, feedback may be monitored to determine if the streetlight should be turned on, the intensity of the streetlight changed or off. If one or more of the sensors providing the sensed data is malfunctioning or is receiving data from an unnatural sources, the NLC may cause the streetlight to enter a pattern of turning the streetlight on and off based on the defective sensed data. In other words, in existing devices, feedback is monitored to determine if the streetlight should be on or off and/or at what intensity and in instances where the streetlight itself or other light sources create too much light to interfere with the sensor or consumption measurement data the NLC may cause the light to operate in an on/off cycling pattern. It will be understood that the cycling pattern may be caused by various feedback and is not limited to feedback from the light sensor. Any feedback that causes the NLC to continuously turn the streetlight on and off is relevant in accordance with embodiments of the present inventive concept.

Accordingly, after monitoring the sensed data, operations in accordance with embodiments discussed herein, proceed to determining, based on the monitored data, that the streetlight is in an unnatural cycle, i.e. operating outside expected parameters (block 310). For example, the streetlight may be on when it should be off, or visa verse. The streetlight may be in a cycle pattern of on and off or the streetlight may be consuming more energy than expected. If it is determined that the streetlight is operating outside expected parameters (block 310), the status of the streetlight may be altered (block 320). For example, if it is determined that the streetlight is cycling too much or its energy consumption is too high, the normal operation of the streetlight may be altered. For example, the monitoring function may be disabled, or the light may be allowed to remain on for a period of time as will be discussed below with respect to flowcharts of FIGS. 4 through 6.

Figure 4:
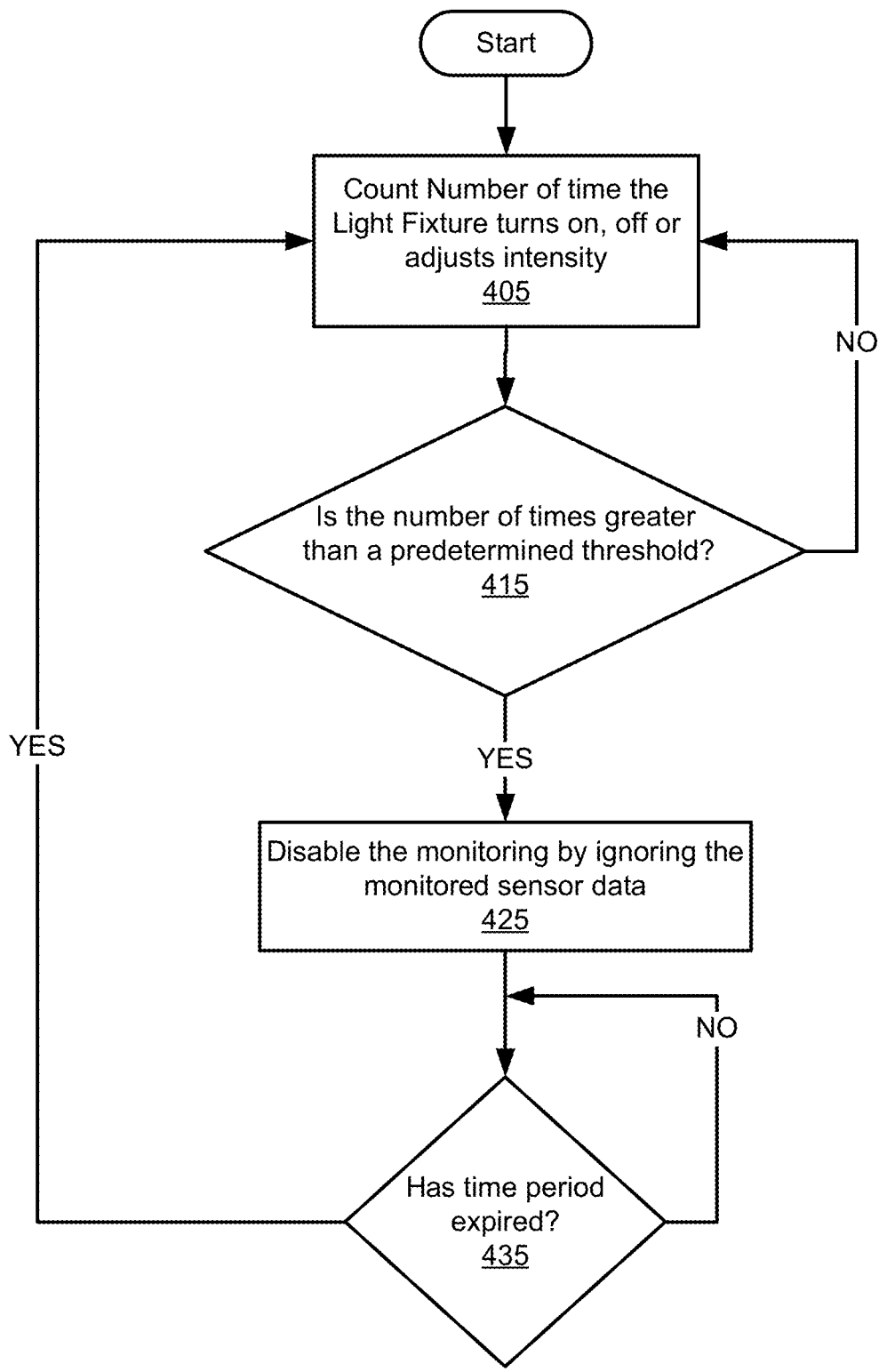

Referring now to FIG. 4, operations for analyzing the monitored sensor data in accordance with some embodiments of the present inventive concept will be discussed. As illustrated in FIG. 4, operations begin at block 405 by counting the number of times the streetlight cycles on/off or the number of times the intensity of the streetlight is adjusted over a predetermined period of time. This time period can be set by the user and may change depending on the streetlight and its location. Thus, the predetermined time period may be set to any reasonable time period, which may be largely dependent on the location of the streetlight.

Once a threshold number of cycles or adjustments is counted over the finite time period, it is determined that the streetlight is not operating in an expected manner (block 415). In other words, it is determined if the number of times the streetlight cycles or adjusts intensity is greater than a specified threshold number (block 415). If it is determined that the threshold has been exceeded, the monitoring function of the controller may be disabled for a finite period of time (block 425). In other words, if it is determined that the streetlight is cycling too much such that it is operating outside expected parameters, remedial action may be taken to avoid excess cycling, waste of power, excessive cost and the like. In embodiments illustrated in FIG. 4, when it is determined that the streetlight is cycling/adjusting outside a normal threshold (block 415), the NLC may be instructed or programmed to automatically ignore the command to turn the light on/off for a finite period of time. It is determined if this finite period of time has elapsed (block 435) and when it has elapsed, operations return to block 405 and repeat such that the NLC may re-enable the monitoring function of block 300 (FIG. 3) and repeat. In other words, if the NLC determines that feedback it is receiving from the one or more sensors is faulty, the NLC may disable the functionality of operating the streetlight based on feedback from the sensors. Thus, it is assumed that the streetlight sensors are responding to a temporary situation at the location of the streetlight, for example, artificial light being sensed by the light sensors at night when a streetlight is supposed to be on. The light sensors associated with the streetlight sense the artificial light provided by a flashlight or headlights and causes the NLC to turn the streetlight off responsive to the sensed light. This is a temporary situation effecting the light sensors of the streetlight. The NLC then waits a finite period of time (block 435) in which the temporary situation may be removed, for example, the headlights are turned off, and re-enables the functionality of operating the streetlight responsive to the feedback from the one or more sensors. Thus, operations may return to block 300 (FIG. 3) and repeat.

If it is determined that the number of types the streetlight cycled or adjusted intensity is not greater than a predetermined threshold (block 415), operations return to block 405 and repeat until the threshold number is reached.

It will be understood that in some situations the cycling or other issues spotted with the functionality of the streetlight may not be caused by a temporary condition at a location of the streetlight, but may be a more serious problem, such as equipment failure or vandalism. Embodiments of the present inventive concept are configured to determine these more serious situations and alert relevant users to take appropriate action as will be discussed with respect to the flowchart of FIG. 6. For example, an NLC may determine that for three consecutive days, the feedback functionality on a particular streetlight had to be disabled due to excessive cycling. At this point, the NLC may alert a user that there may be a more serious problem with the streetlight.

Figure 5:
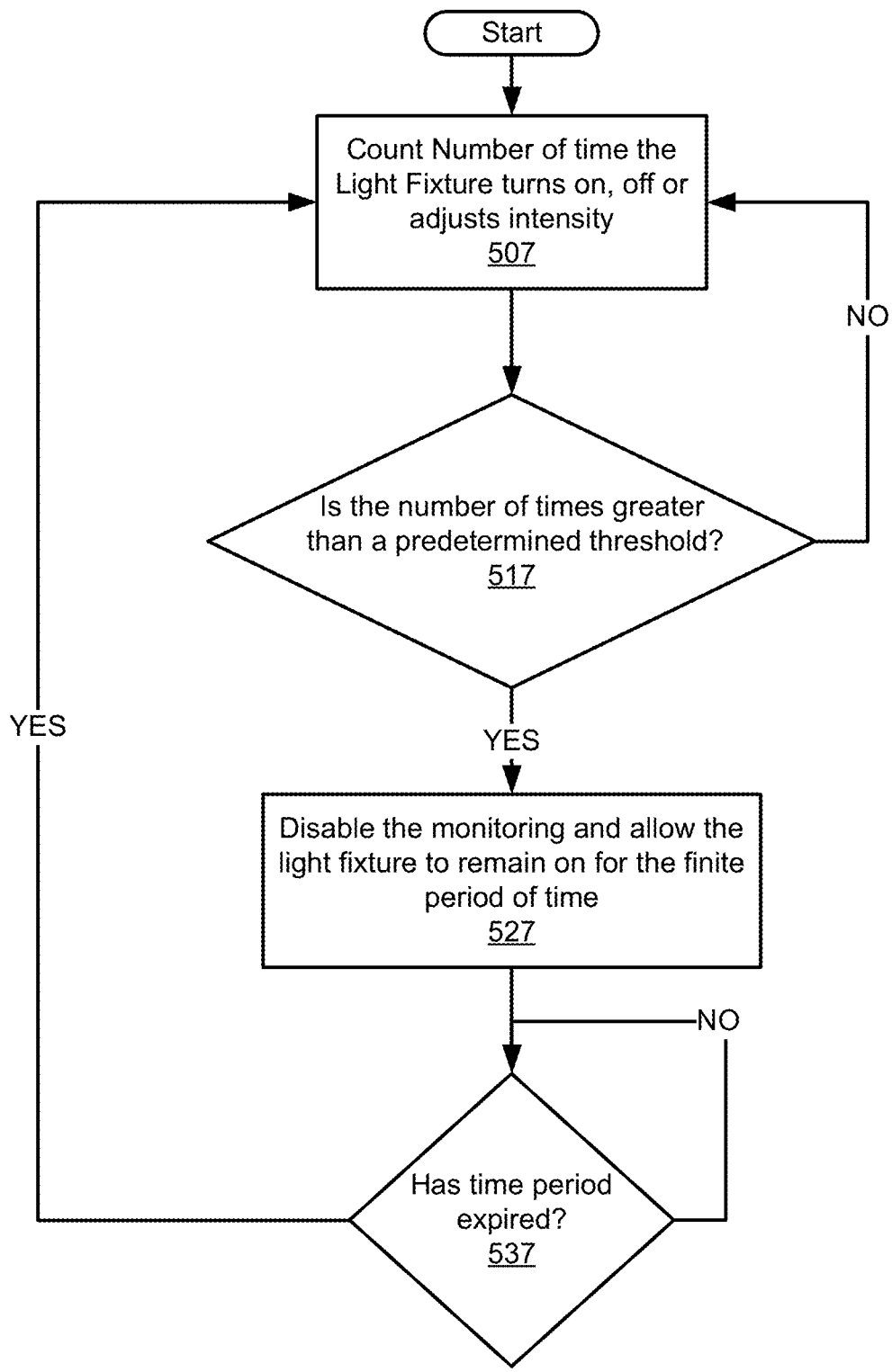

Referring now to FIG. 5, operations for analyzing the monitored sensor data will be discussed in accordance with some embodiments. As illustrated, operations begin at block 507 by counting the number of times the streetlight cycles on/off or the number of times the intensity of the streetlight is adjusted over a predetermined period of time. This time period can be set by the user and may change depending on the streetlight and its location. Thus, the predetermined time period may be set to any reasonable time period, which may be largely dependent on the location of the streetlight.

Once a threshold number of cycles or adjustments is counted over the finite time period, it is determined that the streetlight is not operating in an expected manner (block 517). In other words, it is determined if the number of times the streetlight cycles or adjusts intensity is greater than a specified threshold number (block 517). If it is determined that the threshold has been exceeded (block 517), the monitoring function of the controller may be disabled, and the streetlight may be allowed to remain on for a finite period of time (block 527). Thus, in some embodiments, instead of just turning off the feedback function for a specified period of time responsive to a determination of excessing cycling/adjusting, once the NLC determines that the streetlight is not functioning properly, the NLC may turn the streetlight on for a specified period of time. Then, after it is determined that the finite time period has expired (block 537), the NLC may turn the streetlight off again and enable the feedback function and return to operations of block 300 (FIG. 3) and repeat. These embodiments of the present inventive concept may reduce the likelihood, or possibly, avoid, the possibility that a streetlight will be off in a dark environment when it should be on and, therefore, may avoid creating a potentially dangerous situation.

If it is determined that the number of types the streetlight cycled or adjusted intensity is not greater than a predetermined threshold (block 4517), operations return to block 507 and repeat until the threshold number is reached.

Figure 3:
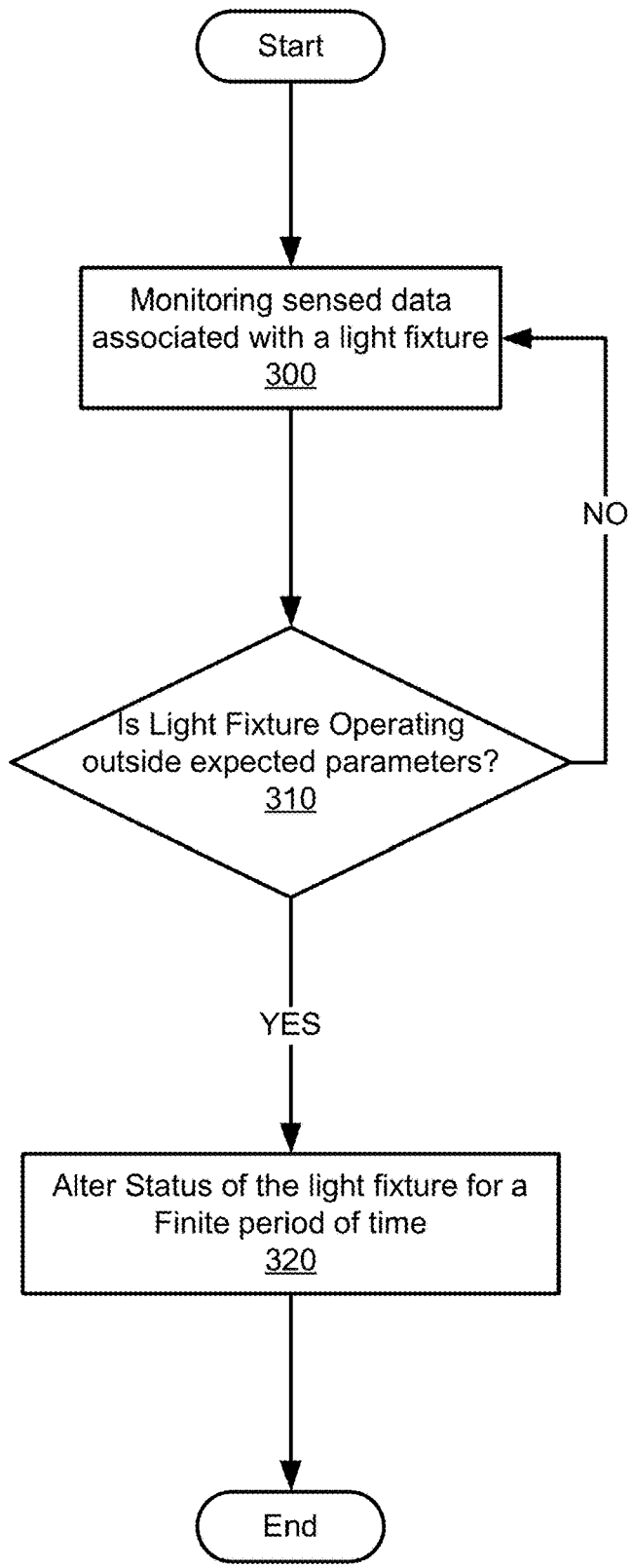
FIGS. 3 through 6 are flowcharts illustrating various operations for remotely monitoring a light fixture in accordance with various embodiments of the present inventive concept.
Figure 6:
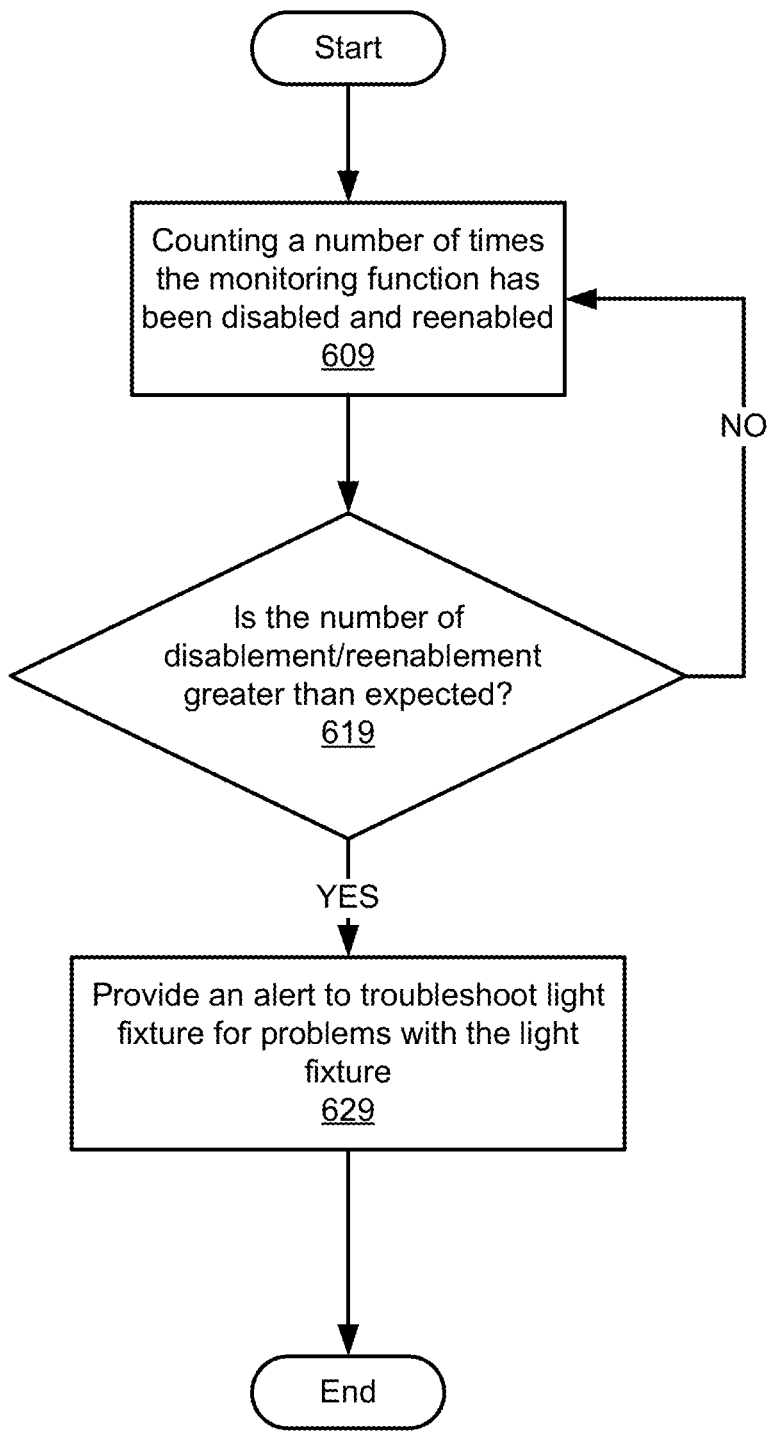

As discussed above, sometimes the cycling issue or over consumption of the streetlight is not remedied by the methods discussed with respect to FIGS. 3 through 5. Accordingly, in some embodiments, operations for further action may be implements. Referring to FIG. 6, operations begin at block 609 by counting the number of times the monitoring function has been disabled and enabled within a specified period of time. If the number of times is outside expected parameters (block 619), an alert may be provided to a user (block 629) such that the user may troubleshoot the issue and determined if there is a more serious problem with the streetlight.

Thus, some embodiments of the present inventive concept provide the ability to detect when a streetlight/light fixture is operating in an unexpected manner, for example, cycling on and off, constantly adjusting intensity, using more power than expected and the like. The ability to detect this behavior is important in that it may prevent the streetlight light from being on during the daytime hours and keeps it on at night and not cycling on and off unless it is testing for daylight conditions.

Figure 7:
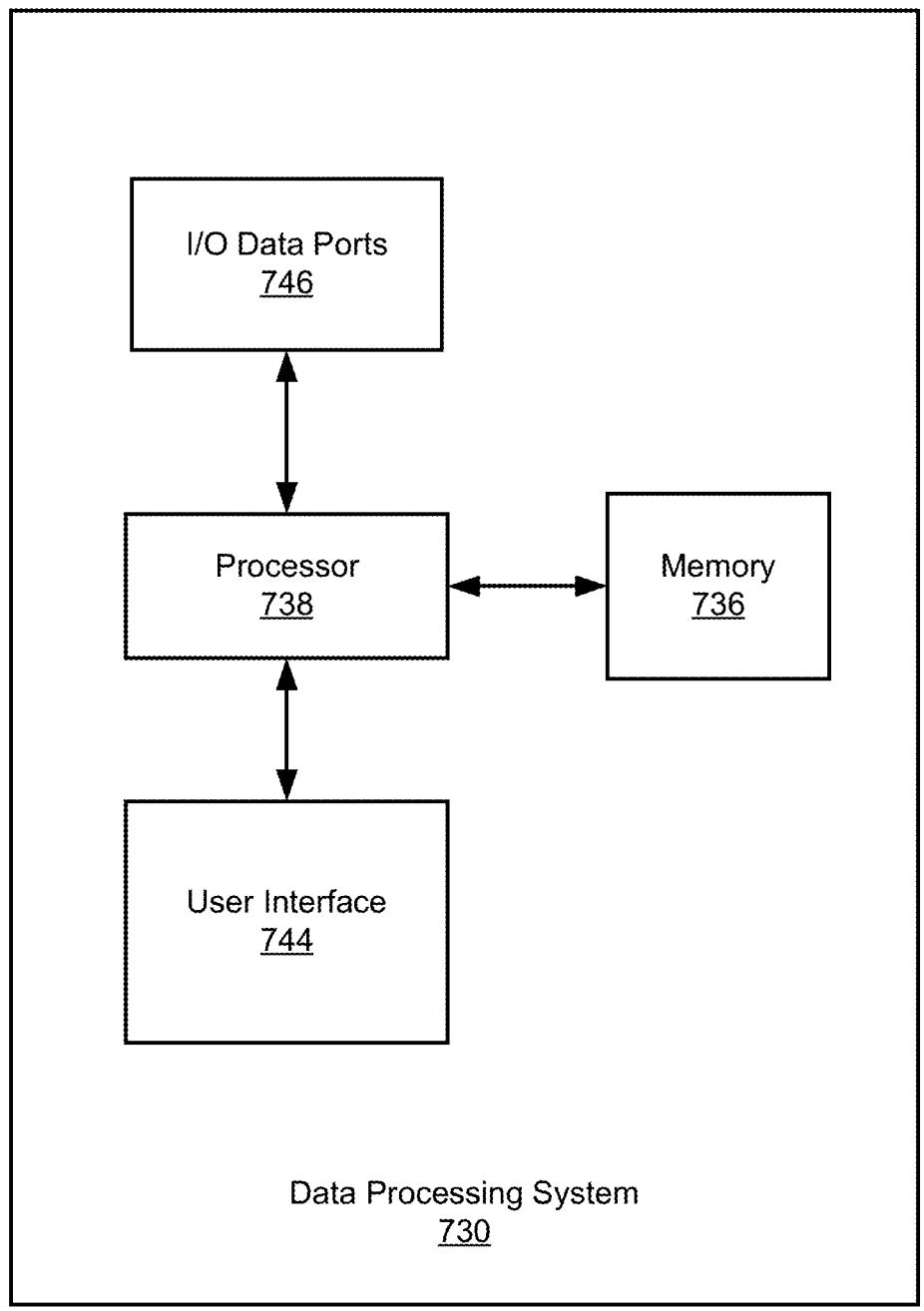
FIG. 7 is a block diagram of a data processing system that may be used in accordance with some embodiments of the present inventive concept.

As is clear from above, some aspects of the present inventive concept may be implemented using a data processing system. The data processing systems may be included in any of the devices discussed herein without departing from the scope of the present inventive concept. Example embodiments of a data processing system 730 configured in accordance with embodiments of the present inventive concept will be discussed with respect to FIG. 7. The data processing system 730 may include a user interface 744, including, for example, input device(s) such as a keyboard or keypad, a display, a speaker and/or microphone, and a memory 736 that communicate with a processor 738. The data processing system 730 may further include I/O data port(s) 746 that also communicates with the processor 738. The I/O data ports 746 can be used to transfer information between the data processing system 730 and another computer system or a network. These components may be conventional components such as those used in many conventional data processing systems, which may be configured to operate as described herein.

As will be appreciated by one of skill in the art, the inventive concept may be embodied as a method, data processing system, or computer program product. Accordingly, the present inventive concept may take the form of an entirely hardware embodiment or an embodiment combining software and hardware aspects all generally referred to herein as a "circuit" or "module." Furthermore, the present inventive concept may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present inventive concept may be written in any programming language, for example, an object-oriented programming language such as Java®, Smalltalk or C++ or assembly language. However, the computer program code for carrying out operations of the present inventive concept may also be written in conventional procedural programming languages, such as the "C" programming language or in a visually oriented programming environment, such as VisualBasic.

The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The inventive concept is described in part below with reference to a flowchart illustration and/or block diagrams of methods, systems and computer program products according to embodiments of the inventive concept. It will be understood that each block of the illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method for remotely monitoring a status of a light fixture, the method comprising:
   monitoring sensor data associated with the light fixture;
   analyzing the monitored sensor data to determine if the light fixture is operating outside expected parameters associated with the light fixture; and
   altering the status of the light fixture for a finite period of time if it is determined that the light fixture is operating outside expected parameters,
   wherein analyzing the monitored sensor data further comprises:
   counting a number of times the light fixture turns on, off or adjusts an intensity thereof within a predetermined period of time, wherein the light fixture turns on, off or adjusts responsive to the monitored sensor data;
   determining if the number of times the light fixture turns on, off or adjusts is greater than a predetermined threshold; and
   disabling the monitoring, analyzing and altering if it is determined that the number of times the light fixture turns on, off or adjusts is greater than the predetermined threshold; and
   wherein at least one of the monitoring, analyzing, and altering is performed by at least one processor.

2. The method of claim 1, wherein the disabling of the monitoring, analyzing and altering comprises ignoring the monitored sensor data for the finite period of time if it is determined that the number of times the light fixture turns on, off or adjusts is greater than the predetermined threshold; and
   wherein the method further comprises re-enabling the monitoring, analyzing and altering after the finite period of time.

3. The method of claim 2, wherein the disabling of the monitoring comprises disabling the monitoring a plurality of times after re-enabling the monitoring and wherein the method further comprises performing further troubleshooting processes to determine if there is a mechanical problem with the light fixture.

4. The method of claim 2, wherein the light fixture is operating outside the expected parameters when one of the number of times the light fixture turns on, off or adjusts an intensity thereof is greater than the predetermined threshold and when a consumption of the light fixture exceeds an expected consumption for the light fixture.

5. The method of claim 1, wherein the disabling of the monitoring, analyzing and altering further comprises allowing the light fixture to remain on for the finite period of time if it is determined that the number of times the light fixture turns on, off or adjusts is greater than the predetermined threshold when the monitoring, analyzing and altering has been disabled; and
   wherein the method further comprises re-enabling the monitoring, analyzing and altering after the finite period of time.

6. The method of claim 5, wherein the disabling of the monitoring comprises disabling the monitoring a plurality of times after the re-enabling of the monitoring and wherein the method further comprises performing further troubleshooting processes to determine if there is a mechanical problem with the light fixture.

7. The method of claim 5, wherein the light fixture is operating outside the expected parameters when one of the number of times the light fixture turns on, off or adjusts an intensity thereof is greater than the predetermined threshold and when a consumption of the light fixture exceeds an expected consumption for the light fixture.

8. The method of claim 1, wherein the sensor data comprises data received from one or more of light sensors, motions sensors, consumption sensors, vibration sensors and temperature sensors.

9. A monitoring module for remotely monitoring a status of a light fixture, the monitoring module communicating with a controller of the light fixture and at least one processor, the at least one processor causing the monitoring module to:
   monitor sensor data associated with the light fixture;
   analyze the monitored sensor data received from the controller of the light fixture to determine if the light fixture is operating outside expected parameters associated with the light fixture, wherein the monitoring module analyzes the monitored sensor data by:
   counting a number of times the light fixture turns on, off or adjusts an intensity thereof within a predetermined period of time, wherein the light fixture turns on, off or adjusts responsive to the monitored sensor data;
   determining if the number of times the light fixture turns on, off or adjusts is greater than a predetermined threshold;
   disabling the monitoring, analyzing and altering if it is determined that the number of times the light fixture turns on, off or adjusts is greater than the predetermined threshold; and
   alter the status of the light fixture for a finite period of time if it is determined that the light fixture is operating outside expected parameters.

10. The monitoring module of claim 9, the at least one processor causing the monitoring module to further:
    disable the monitoring, analyzing and altering by ignoring the monitored sensor data for the finite period of time if it is determined that the number of times the light fixture turns on, off or adjusts is greater than the predetermined threshold; and re-enable the monitoring, analyzing and altering after the finite period of time.

11. The monitoring module of claim 10, the at least one processor causing the monitoring module to further perform further troubleshooting processes to determine if there is a mechanical problem with the light fixture if the monitoring is disabled a plurality of times after being re-enabled.

12. The monitoring module of claim 10, wherein the light fixture is operating outside the expected parameters when one of the number of times the light fixture turns on, off or adjusts an intensity thereof is greater than the predetermined threshold and when a consumption of the light fixture exceeds an expected consumption for the light fixture.

13. The monitoring module of claim 9, wherein the at least one processor causes the monitoring module to further:

allow the light fixture to remain on for the finite period of time if it is determined that the number of times the light fixture turns on, off or adjusts is greater than the predetermined threshold when the monitoring, analyzing and altering has been disabled; and re-enable the monitoring, analyzing and altering after the finite period of time.

14. The monitoring module of claim 13, wherein the at least one processor causes the monitoring module to further perform further troubleshooting processes to determine if there is a mechanical problem with the light fixture if the monitoring is disabled a plurality of times after the re-enabling of the monitoring.

15. The monitoring module of claim 14, wherein the light fixture is operating outside the expected parameters when one of the number of times the light fixture turns on, off or adjusts an intensity thereof is greater than the predetermined threshold and when a consumption of the light fixture exceeds an expected consumption for the light fixture.

16. The monitoring module of claim 9, wherein the sensor data comprises data received from one or more of light sensors, motions sensors, consumption sensors, vibration sensors and temperature sensors.

17. A computer program product for remotely monitoring a status of a light fixture, the computer program product comprising:
  a non-transitory computer readable storage medium having computer readable program code embodied in the non-transitory computer readable storage medium, the computer readable program code comprising:
  computer readable program code to monitor sensor data associated with the light fixture;
  computer readable program code to analyze the monitored sensor data to determine if the light fixture is operating outside expected parameters associated with the light fixture; and
  computer readable program code to alter the status of the light fixture for a finite period of time if it is determined that the light fixture is operating outside expected parameters,
  wherein the computer readable program code to analyze the monitored sensor data comprises:
    computer readable program code to count a number of times the light fixture turns on, off or adjusts an intensity thereof within a predetermined period of time, wherein the light fixture turns on, off or adjusts responsive to the monitored sensor data;
    computer readable program code to determine if the number of times the light fixture turns on, off or adjusts is greater than a predetermined threshold; and
    computer readable program code to disable the monitoring, analyzing and altering if it is determined that the number of times the light fixture turns on, off or adjusts is greater than the predetermined threshold.

18. The computer program product of claim 17, wherein the computer readable program code to disable the monitoring, analyzing and altering further comprises ignoring the monitored sensor data for the finite period of time if it is determined that the number of times the light fixture turns on, off or adjusts is greater than the predetermined threshold; and
  wherein the computer program product further comprises computer readable program code to re-enable the monitoring, analyzing and altering after the finite period of time.

19. The computer program product of claim 17, wherein the computer readable program code to disable the monitoring, the analyzing and the altering further comprises computer program code to allow the light fixture to remain on for the finite period of time if it is determined that the number of times the light fixture turns on, off or adjusts is greater than the predetermined threshold when the monitoring, analyzing and altering has been disabled; and
  wherein the computer program product further comprises computer readable program code to re-enable the monitoring, analyzing and altering after the finite period of time.

20. The computer program product of claim 17:
  wherein the light fixture is operating outside expected parameters when one of the number of times the light fixture turns on, off or adjusts an intensity thereof is greater than the predetermined threshold and when a consumption of the light fixture exceeds an expected consumption for the light fixture; and
  wherein the sensor data comprises data received from one or more of light sensors, motions sensors, consumption sensors, vibration sensors and temperature sensors.

* * * * *